(12) United States Patent  (10) Patent No.: US 8,081,187 B2
Perani et al.  (45) Date of Patent: Dec. 20, 2011

(54) PENCIL STROKES FOR VECTOR BASED DRAWING ELEMENTS

(75) Inventors: Michael Perani, San Rafael, CA (US); Nikolai Sander, San Rafael, CA (US)

(73) Assignee: Autodesk, Inc., San Rafael, CA (US)

( * ) Notice: Subject to any disclaimer, the term of this patent is extended or adjusted under 35 U.S.C. 154(b) by 1037 days.

(21) Appl. No.: 11/562,832

(22) Filed: Nov. 22, 2006

(65) Prior Publication Data

US 2008/0117214 A1  May 22, 2008

(51) Int. Cl.
  *G06T 11/20* (2006.01)
(52) U.S. Cl. ........................................ 345/441
(58) Field of Classification Search ........... 345/441–443
  See application file for complete search history.

(56) References Cited

U.S. PATENT DOCUMENTS

| 5,611,036 | A * | 3/1997 | Berend et al. | 345/441 |
| 6,970,169 | B1 * | 11/2005 | Harris | 345/440 |
| 2004/0036693 | A1 * | 2/2004 | Yoon et al. | 345/582 |
| 2008/0018650 | A1 | 1/2008 | Sander | |

OTHER PUBLICATIONS

GPU Gems: programming techniques, tips, and tricks for real-time graphics . . . ; Chapter 5 Implementing Improved Perlin Noise; 2004; Addison-Wesley; book pp. 73-85, HTML printout pp. 1-18.*
John C. Hart, Perlin Noise Pixel Shaders; 2001; Proceedings of the ACM SIGGRAPH/EUROGRAPHICS workshop on Graphics hardware; pp. 87-94.*
Ken Perlin; Improving Noise; Jul. 2002; Proceedings of ACM SIGGRAPH 2002; vol. 21, issue 3; pp. 681-682.*
Damien Marshall, Declan Delaney, Damien Marshall, Declan Delaney, Seamus Mcloone, Tomas Ward; Representing Random Terrain on Resource Limited Devices; 2004; IJIGS/University of Wolverhampton/EUROSIS; pp. 1-5.*
Matthew Kaplan and Elaine Cohen; A Generative Model for Dynamic Canvas Motion; May 18-20, 2005; Computational Aesthetics 2005, Eurographics Workshop on Computational Aesthetics in Graphics (2005), Visualization and Imaging, Girona, Spain; pp. 49-56.*
International Search Report. Aug. 21, 2008.

* cited by examiner

*Primary Examiner* — Jeffery A Brier
(74) *Attorney, Agent, or Firm* — Patterson & Sheridan, LLP

(57) ABSTRACT

Embodiments of the invention provide techniques for generating displays of vector drawing elements that have the appearance of being hand drawn using traditional media materials, such as a pencil. Multiple pencil strokes to be rendered on top of each other and the structure of the simulated paper surface remains constant, generating a realistic appearance for multiple rendered pencil strokes. A variety of physical characteristics of pencils and paper surfaces may be specified, and a convincing appearance may be achieved by modeling these parameters in software, and speed may be realized by rendering the pencil effect using a shader program executed on graphics hardware.

21 Claims, 6 Drawing Sheets

PENCIL STROKES FOR VECTOR BASED DRAWING ELEMENTS

BACKGROUND OF THE INVENTION

1. Field of the Invention

The present invention generally relates to computer software and hardware. More specifically, the present invention relates to a method and system for rendering a display of vector based drawing elements using a pencil stroke effect.

2. Description of the Related Art

Computer graphics are frequently generated using vector-based drawing representations of drawing elements. A vector-based drawing element includes a mathematical description that specifies the position, length, and direction in which lines are drawn to represent that element. Common vector-based drawing elements include lines, splines, curves, arcs, NURBS, etc. Using a vector-based representation of the drawing elements differs from bit-maps or rasterized images where a display image is represented as an array of picture elements (pixels) where a specific color value and intensity is specified for each pixel in the display. Representing a display image by lines and curves, i.e., as a vector-based drawing, rather than by bitmaps allows drawings to require less storage space. Additionally, vector based drawings are readily scalable to any desired size, where rasterized images will lose detail when shrunk and when increased in size.

Further, applying graphic effects to a rasterized image can be a repetitive and tedious process. Generally, a user must erase and redraw the pixels covered by the line to product a desired effect, e.g., a change in color. Blending such changes with surrounding regions in a drawing can turn into a pixel by pixel evaluation. In contrast, to change the color of a vector based line, a color property for the line may be changed. Thereafter, when that line is rendered the updated color is used.

At the same time, where a great deal of work has been done to create display effects for rasterized display representations, vector drawing applications have typically been more limited in the effects that may be applied to a vector drawing element. For example, vector drawing applications are unable to generate a display representation of vector drawing elements, where the display representation has a realistic traditional media appearance. That is, where the vector drawing element (e.g., a collection of lines and curves) takes on the appearance of being hand-drawn using a pencil stroke.

One approach has been to use a texture map to create the appearance of a pencil stroke on a vector graphics element. While this approach works to a certain degree, it fails to provide a realistic appearance in many cases, particularly where multiple vector drawing elements intersect one another. This occurs because the texture map is "painted" onto the shape of the drawing element without regard for the structure of an underlying paper surface. Thus, where a one drawing element is rendered to include a stroke with at one density, another drawing element rendered at the same location may be rendered using a different density for stroke appearance. This typically results in a display representation that fails to provide a realistic hand-drawn appearance.

Accordingly, there is a need in the art for improved techniques for generating the appearance of pencil strokes from vector based drawing elements.

SUMMARY OF THE INVENTION

Embodiments of the invention include a method for generating a display of a vector drawing element using a vector-based drawing application to have an appearance of being drawn using a media material, such as a pencil, crayon, chalk, pastel, and the like. The method generally includes receiving the vector drawing element and a collection of stroke parameters. The stroke parameters model aspects of the media material. For example, parameters such as a pencil tip width, profile, pencil hardness, an angle which the pencil is held, pressure applied to paper, and beginning/ending stroke strike and lift rates may be specified as stroke parameters. The method also includes simulating a paper surface using a high-frequency noise map and a low-frequency noise map. In a particular embodiment the noise maps may be generated using a Perlin noise function. The high-frequency noise map may simulate fine structure elements of the paper surface, and the low-frequency noise map may simulate individual long fiber elements of the paper surface. The method also includes determining a set of pixels covered by the vector drawing element and for a pixel in the set of pixels, sampling the high-frequency noise map, the low-frequency noise map, and a smooth step map, to determine a color and a transparency value for the pixel. The noise maps may be generated prior to rendering the vector drawing elements and stored as texture maps.

In one embodiment, vector drawing element may be represented as a collection of input vertices processed by processing units of a graphics rendering pipeline, this allows for the rapid processing of large data sets of vector drawing elements. Further, embodiments of the invention may be used to generate display images of a vector drawing that have a hand-drawn appearance. The appearance of a given pencil stroke may be customized using a variety of parameters specifying characteristics of both the media material (e.g., pencil hardness) and a paper surface (e.g. coarseness, graininess). A convincing look is achieved by modeling these parameters in software, and speed may realized by rendering vector drawing using a shader programs executed on programmable graphics hardware.

BRIEF DESCRIPTION OF THE DRAWINGS

So that the manner in which embodiments of the present invention may be understood in detail, a more detailed description of the invention, briefly summarized above, may be had by reference to the appended drawings. These drawings, however, illustrate typical embodiments of the invention and are not meant to be limiting of its scope, for the invention may admit to other equally effective embodiments.

DETAILED DESCRIPTION OF THE PREFERRED EMBODIMENTS

Computer aided design (CAD) drawings are often used to generate screen displays and printed materials related to architecture, engineering and construction projects. Often, such drawings are composed using vector based drawing systems. Embodiments of the invention provide techniques for generating displays of vector drawing elements that have the appearance of being hand drawn using traditional media materials. For example, a collection of arcs, lines, points, and curves included in a vector-based drawing may be rendered to appear as if hand-drawn on a paper surface using a pencil. Other examples of traditional media materials include crayons, chalk, pastels, and the like.

Embodiments of the invention include a vector rendering technique used to simulate graphite and colored pencils. The rendering techniques may be implemented using shader programs composed in a High Level Shading Language (HLSL). The use of graphics hardware may allow complicated line and vector drawings to be rendered as pencil strokes in real time. Further, multiple pencil strokes to be rendered on top of each other and the structure of the underlying "paper" may remain constant, generating a realistic appearance for multiple rendered pencil strokes.

A variety of physical characteristics of pencils may be specified, including, for example, a pencil tip width, profile, pencil hardness, an angle which the pencil is held, pressure applied to paper, and beginning/ending stroke strike and lift rates. In addition to parameters describing properties of a pencil, different paper surfaces may be simulated. In one embodiment, a convincing look is achieved by modeling these parameters in software, and speed is realized by rendering the pencil effect using a pixel shader program executed on graphics hardware.

Figure 1:
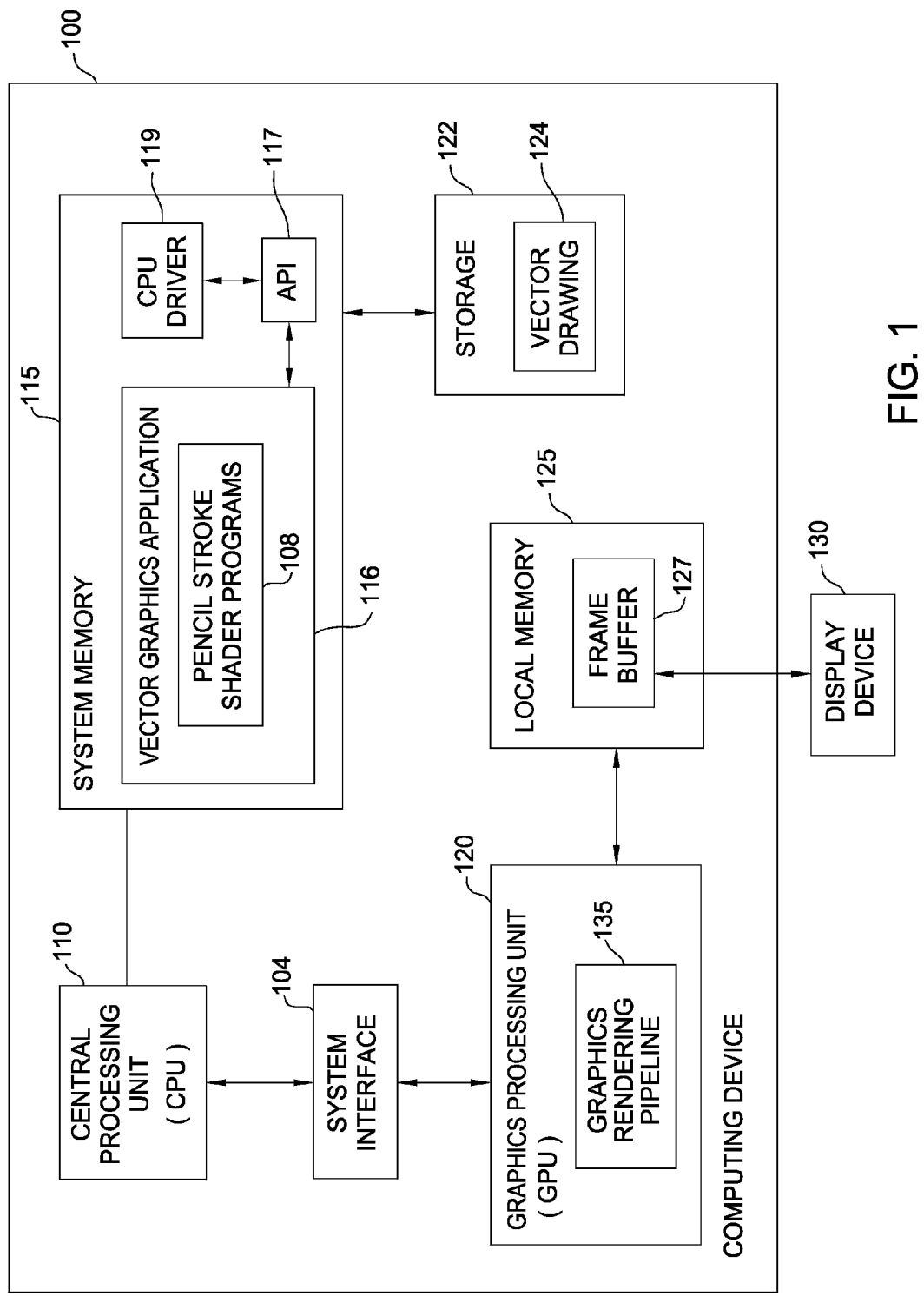
FIG. 1 is a conceptual illustration of a computing device, according to one embodiment of the invention.

FIG. 1 is a conceptual diagram of a computing device 100 configured to implement one or more aspects of the present invention. As shown, computing device 100 includes, without limitation, a central processing unit (CPU) 110 connected to a system memory 115, system storage 122, a system interface 104, a graphics processing unit (GPU) 120, and a local memory 125 coupled to both GPU 120 and a display device 130. GPU 120 includes at least one graphics rendering pipeline 135 used to process graphics data. The graphics rendering pipeline 125 may include one or more programmable shader engines used to process data transmitted to GPU 120 by vector graphics application 116 (using an API 117).

System memory 115 includes a vector graphics application 116 that includes one or more pencil stroke shader programs 108. For example, the Autodesk® Impression™ application (and associated utilities) may be used. The Impression™ application is designed as a colorization and illustration system for large vector-based page descriptions. System memory 115 also includes a GPU driver 119 and an application program interface (API) 117. Generally, GPU driver 119 implements the functions and data structures exposed by API 117 for a given GPU 120. Well known graphics APIs include the DirectX® API available from Microsoft and the freely available OpenGL API. Illustratively, storage 122 includes vector drawing 124. Vector drawing 124 may include any number of vector-based drawing elements such as points, lines, polygons, arcs, rectangles, circles, splines, text, ellipses, elliptical arcs, arc wedges, elliptical arc wedges, and symbols.

Vector graphics application 116 may be configured to invoke functions provided by API 117 to produce a desired set of results, typically in the form of one or more images representing the vector drawing elements of vector drawing 124. Vector graphics application program 116 may also be configured to transmit one or more high-level shader programs 108 and image data to the API 117 for processing by GPU driver 119. The GPU driver 119 transmits shader programs 108 to processing units on GPU 120. The shader programs 108 are typically source code text of high-level programming instructions that are designed to operate on one or more programmable shader units within GPU 120.

Local memory 125 is shown to include a frame buffer 127. Typically, data output from the graphics rendering pipeline 135 may be stored in frame buffer 127. When graphics rendering pipeline 135 completes rendering a display frame, the contents of frame buffer 127 may be output for display on display device 130, such as a CRT or LCD monitor. In some cases, the output of rendering operations may not be used for immediate display, such as when graphics rendering pipeline 135 is used to generate frames for an animation sequence or to generate a rasterized set of images used in creating documentation, e.g., display images of architectural, engineering and construction documents.

Persons skilled in the art will recognize that any system having one or more processing units configured to implement the teachings disclosed herein falls within the scope of the present invention. For example, computing device 100 may be, without limitation, a desk-top computer, a laptop computer, a mobile telephone, a set-top box or a personal digital assistant. CPU 110 generally executes programming instructions stored in the system memory 115, operates on data stored in system memory 115 and communicates with GPU 120 through system interface 104, which bridges communication between CPU 110 and GPU 120. In alternate embodiments, the CPU 110, GPU 120, system interface 104, or any combination thereof, may be integrated into a single processing unit. Further, the functionality of GPU 120 may be included in a chipset or in some other type of special purpose processing unit or co-processor.

Figure 2:
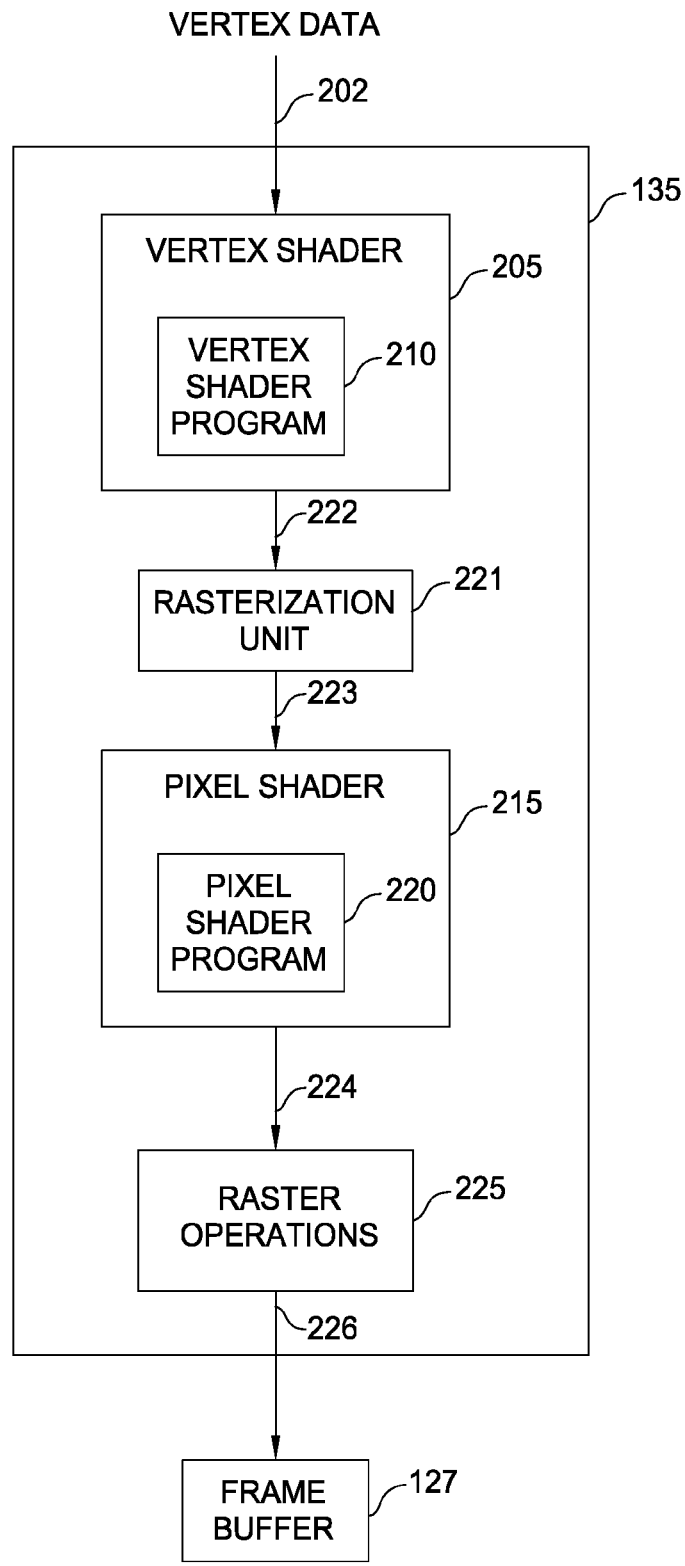
FIG. 2 is a conceptual illustration of a graphics rendering pipeline, according to one embodiment of the invention.

FIG. 2 is a data flow diagram of a programmable graphics rendering pipeline 135 residing within GPU 120 of FIG. 1, according to one embodiment of the present invention. As stated graphics rendering pipeline 135 may include one or more programmable shader engines, arranged in sequence and configured to process data through graphics pipeline 135. Illustratively, graphics rendering pipeline 135 processes data through a vertex shader 205, a pixel shader 215, and a raster operations unit 225. Vertex shader 205 and the pixel shader 215 may be configured to execute vertex shader program 210 and pixel shader program 220, respectively. Vertex shader 205 executes a vertex shader program 210 in order to process a stream of vertex data 202. The vertex data may provide a description of the vector drawing elements included in vector drawing 124. The vertex shader results 222 may be rasterized by a rasterization unit 221. The rasterization unit 221 transforms the vertex shader results 222 (typically, a collection of triangles and/or polygons) into a set of rasterized pixel data 223. This rasterized pixel data 223 is then passed to pixel shader 215, where pixel shader program 220 is executed for each pixel of the rendered surface. As described in greater detail herein, the pixel shader program 220 may be configured to assign transparency and color values to each pixel covered by a vector drawing element. Additionally, the pixel shader results 224 may be further processed by raster operations unit (ROP) 225. ROP unit 225 may be configured to conduct any depth and stencil testing on the shaded pixels, as specified by the vector graphics application 116 and pixels surviving depth and stencil testing are written to frame buffer 127 as shaded pixels 226. Then a video refresh element (not shown) scans data stored in frame buffer 127 out to display device 130 of FIG. 1. Alternatively, the shaded pixels 226 may be saved as a rendered image of a given vector drawing 124. An example of a vertex shader program 210 and a pixel shader program 220 used to create pencil strokes for vector drawing elements is described in greater detail below in conjunction with FIGS. 3-4.

Figure 3:
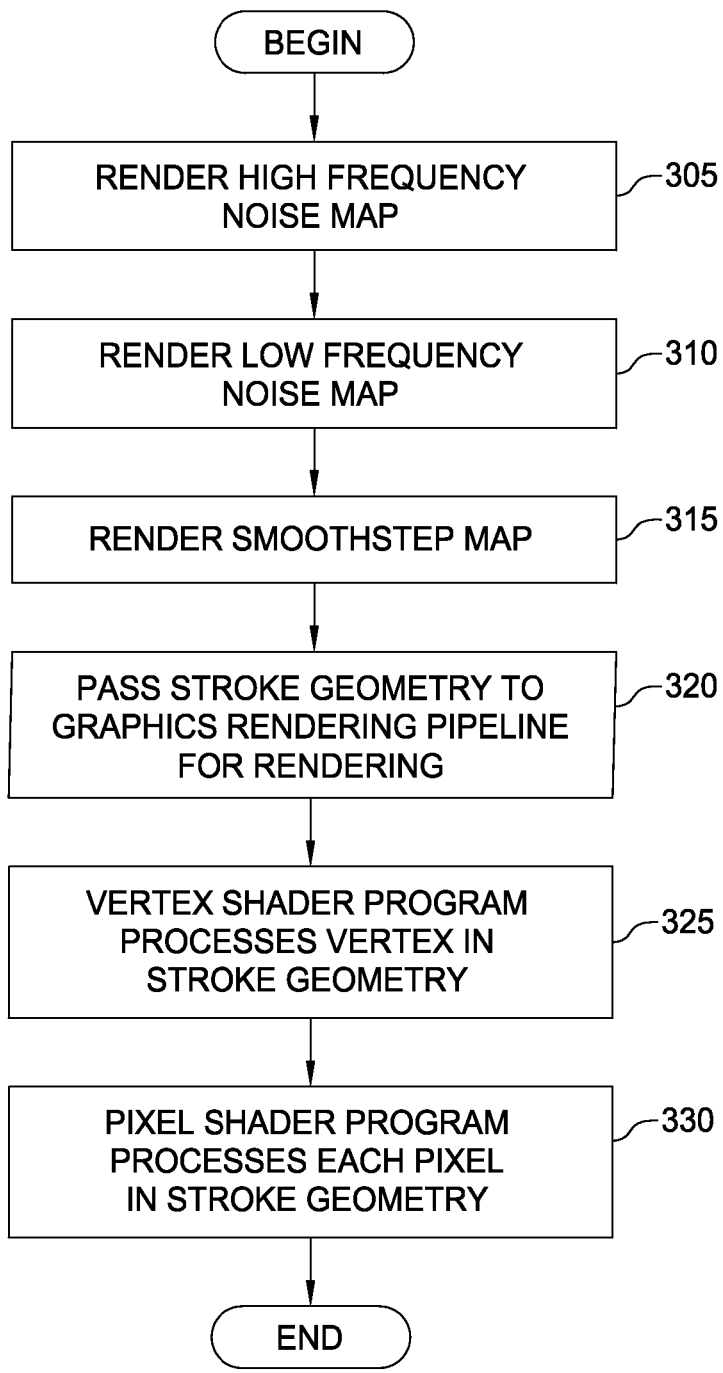
FIG. 3 illustrates a method for rendering a display image of a vector drawing element to have a hand-drawn appearance, according to one embodiment of the invention.

FIG. 3 illustrates a method 300 for rendering a display image of a vector drawing element to have the appearance of a pencil stroke, according to one embodiment of the invention. Persons skilled in the art will understand that any system configured to perform the steps of method 300, in any order, is within the scope of the present invention.

At steps 305 and 310 noise maps are rendered to simulate the surface of a sheet of paper on which rendered pencil strokes are to be drawn. The noise maps provide pseudo-randomly varying data values to simulate variations in the structure of a paper surface. In one embodiment, a Perlin noise function may be used to generate both a high-frequency noise map and a low-frequency noise map. As is known, Perlin noise is a technique that uses random numbers to generate natural looking textures. Perlin noise resembles band-limited white noise and is often used in computer graphics applications to give computer-generated images a more natural-looking appearance by imitating the pseudo-randomness of nature. In one embodiment, the Perlin noise maps may be rendered prior to rendering any vector drawing elements and stored as a texture map. The Perlin noise maps may be sampled by shader programs running on graphics rendering pipeline 135. By using the same Perlin noise maps for multiple vector drawing elements, multiple drawing elements may be rendered with the appearance of being drawn on the same paper surface.

Figure 4A:
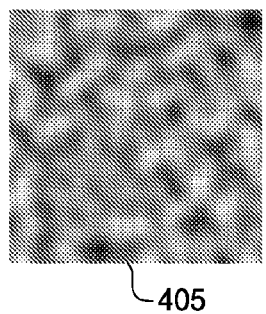
FIG. 4 illustrates noise maps used to represent a paper surface, according to one embodiment of the invention.
Figure 4A:
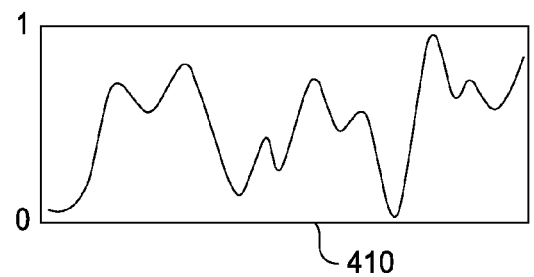

At step 305, a high-frequency Perlin noise map is rendered. The high frequency noise map may be used to represent the finer structure elements of a paper surface. FIG. 4A shows an illustration of a high frequency noise map 405. Variations in noise map 405 may also be represented as a height map 410. As shown, the heights in height map 410 have been normalized to a range of values between 0 and 1 (with lighter regions of the noise map 405 corresponding to greater values).

Figure 4B:
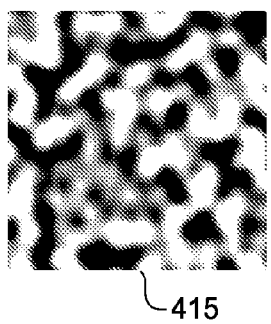
Figure 4B:
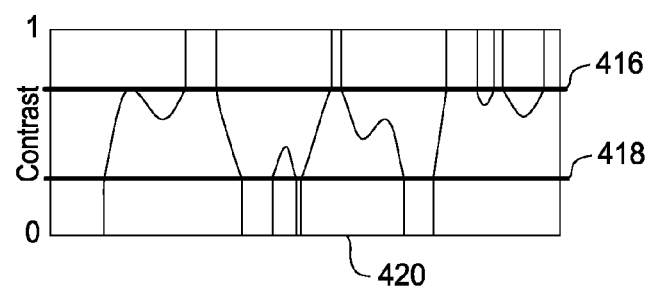

In one embodiment, one of shader programs 108 may be used to generate high-frequency noise map 405. Additionally, such a shader program 108 may use parameters representing bias, contrast, and noise scale to generate a high-frequency noise map. Each of these parameters may be used to vary the composition of the simulated paper surface on which vector drawing elements are to be rendered. The scale parameter may be used to specify the frequency of the high-frequency noise map 410. The contrast parameter may be used to specify how narrow the range of values is allowed to be before being clamped to the maximum or minimum value, effectively making all peaks and valleys of height map 410 flat at various points. For example, FIG. 4B illustrates noise map 415 and a corresponding height map 420. As shown, height map 420 clamps the values of height map 410 using contrast settings 416 and 418. The effect of these contrast settings on noise map 405 is shown in noise map 415. Illustratively, the contrast settings increase the regions in noise map 415 that are either the greatest or smallest possible value. Any values in noise map 420 greater than contrast setting 416 is considered to have a height of 1. Similarly, any values in noise map 420 lower than contrast setting 420 is considered to have a height of 0.

Figure 4C:
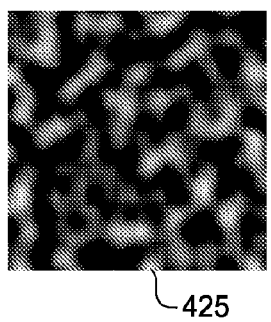
Figure 4C:
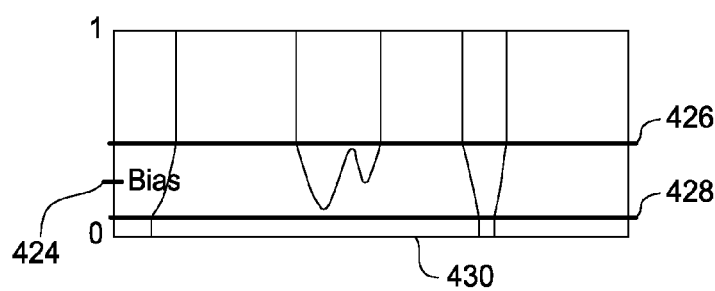

The bias parameter may be used by a shader program to set the center of the range of values for the high-frequency height map. The greater the bias, the more of the "hills" on a paper surface is rendered (graphically more white), the lower the bias, the more of the "valleys" of a paper surface are rendered (graphically more black). In other words, the bias may be used to favor either the low or high value of the high-frequency noise map in order to simulate different paper surfaces. For example, FIG. 4C illustrates a height map 430 with contrast settings 426 and 428, and a bias setting 424. Illustratively, the impact of these setting on noise map 405 is shown in noise map 425. By setting a low contrast setting 426, much of the noise map 425, is shown in a fully dark state.

Figure 4D:
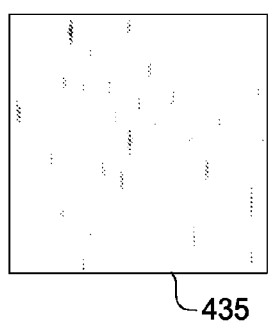

Returning to the method 300 shown in FIG. 3, at step 310, a low-frequency Perlin noise map is rendered. The low-frequency noise map may be used to represent individual long fibers present on a paper surface. In one embodiment, a shader program configured to generate the low-frequency noise map may use a scaling parameter (VFactor) that the y-value of elements in the low-frequency noise-map are multiplied by in order to achieve a squeezing effect. This is illustrated in FIG. 4D which shows low-frequency noise map 435 having a slightly fibrous appearance running vertically. In one embodiment, the fibrous appearance may be rotated using a matrix transformation to allow simulate paper fibers running across a paper surface in different directions.

At step 315, a smooth step map is rendered. As is known, a smooth step function may be used by a programmable shader to blend between two colors, or to fade one graphic element into an underlying texture. In context of the present invention, a smooth step function may be used to provide a smooth fade for the appearance of a pencil stroke on all four sides. The results of the smooth step function may be used to help generate a realistic appearance for a rendered pencil stroke effect by blending all edges of the stroke with the smooth step function. By adjusting the amount of blending at the upper and lower edge of the stroke the tilt angle at which the pencil is held may be simulated. In one embodiment, the smooth step function may be rendered into a 1D texture map and accessed using texture lookups, rather than having the smooth step function be evaluated directly for each point on a stroke being rendered.

As stated, the high-frequency noise, low-frequency noise, and smooth step maps generated at steps 305, 310, and 315, may be pre-rendered and used for rendering multiple vector drawing elements. Once rendered these maps may be stored as texture maps and accessed while graphics rendering pipeline 135 rendered vector-drawing elements to appear as pencil strokes. At step 320, the stroke geometry for a given vector drawing element is passed to the graphics rendering pipeline 135 for rendering using vertex shader program 210 executing on vertex shader 205, it is then rasterized and the resulting pixels are passed to the pixel shader program 220 running on pixel shader 215. In one embodiment, graphics application 116 may invoke functions provide by API 117 to begin rendering vector drawing elements included in vector drawing 124. For example, the DirectX API calls of DrawIndexedPrimitive( ) or DrawPrimitive( ) may be used to pass the stroke geometry parameters to GPU driver 119. In turn, GPU driver 119 causes the programmable shaders of graphics rendering pipeline 120 to execute on this data.

At step 325, vertex shader program 210 may be executed for each vertex included in the stroke geometry passed to the graphics pipeline 125. The vertex shader program 210 may be configured to transform the vertices induced in a vector drawing element into a page space. That is, vertex shader program 210 may transform the positions of input vertices into a coordinate space representing a paper surface on which the stroke geometry is being drawn.

In order for the paper pattern to stay fixed when a vector drawing element is moved from one position to another, the page position of the currently rendered pixel may be used as UV coordinate for subsequent sampling into high-frequency noise texture in the pixel shader. In order to do this, this position may be stored as a texture coordinate by the vertex shader program. Additionally, two sets of UV coordinates may be used by the vertex shader program, one for the high-frequency noise and one for the low-frequency noise. Both UV coordinates may be multiplied by a UV-scale factor to allow scaling of the page pattern. By matching the scale of the noise-map and the UV-scale, aliasing effects may be avoided. In addition to scaling, the low frequency UV coordinate may be multiplied with a rotation matrix to simulate papers with differently oriented fibers. Additionally, the length of the stroke geometry being rendered may be passed as a parameter to vertex shader 210. This parameter may be used by to simulate the fading or tapering that occurs as a pencil begins or ends drawing a line on a paper surface in a page space, i.e., a coordinate space representing a paper surface or drawing areas. Table I, below, provides an example summary of the operations of vertex shader program 210.

TABLE I

Exemplary Vertex Shader Program Operations

Transform input vertex coordinates into page space coordinates
Create high-frequency texture coordinate for input vertex by multiplying page space position with scale factor
Create low-frequency texture coordinate for input vertex by rotating page space position and multiplying it with scale factor
Create stroke length texture coordinate position for input vertex At step 330, pixel shader program 220 may be executed for each set of vertex shader results 222 output by vertex shader program 210. In one embodiment, pixel shader program 210 may be configured to generate a color value to use for each pixel covered by a vertex of the vector drawing element being rendered. As the length of the stroke is provided as a separate UV coordinate, the blending may begin at the start and end of the stroke in page space. The fading values may be calculated by dividing the amount of blending by the length of the stroke so it is normalized A blending value may then be calculated using the U-coordinate that goes from 0 to 1 along the length of the stroke being rendered. The blending at the top and bottom edge of the stroke may be performed without taking the width of the stroke into consideration. By using different values for the blending at the top vs. bottom of the stroke allows a tilt angle of the pencil to be simulated. Additionally, the values in the smooth step map generated at step 315 may be used to provide a smooth looking fade for all four sides of the stroke. The fading values may then be multiplied by the value received from the texture lookup for the pixel in the high-frequency noise map and low-frequency noise map. Table II, below, provides an example summary of the operations of vertex shader program 220.

TABLE II

Exemplary Pixel Shader Program Operations

Figure 5:
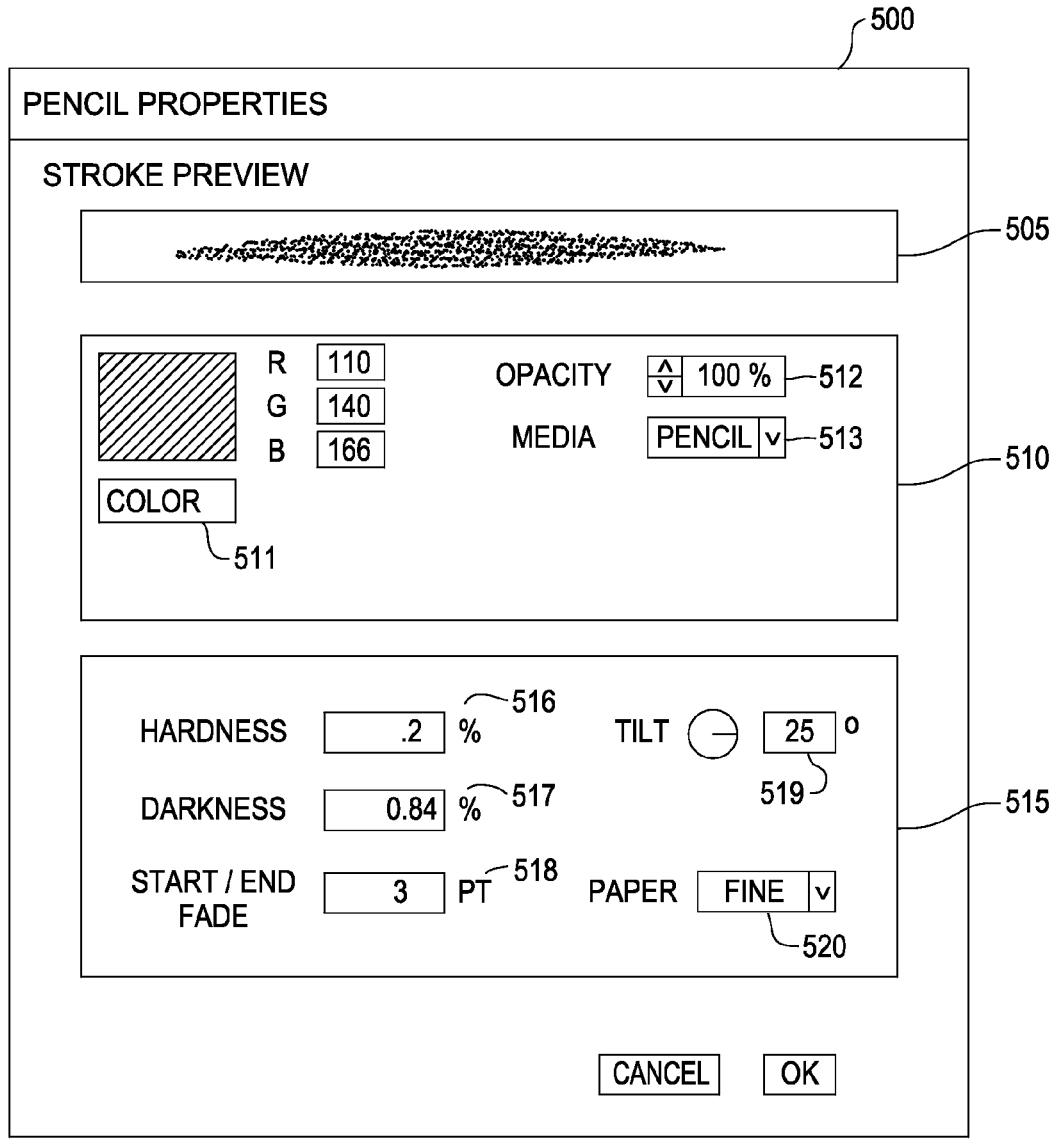
FIG. 5 illustrates a vector drawing element rendered as a pencil stroke, according to one embodiment of the invention.

For each pixel on the stroke surface:
    Calculate start and end blending values for a current pixel:
      Sample the smooth step map for start-edge and end-edge blending, given the normalized U-coordinate of the current pixel
      Multiply blending factors for the U-coordinate factors together
      Sample the smooth step map for upper-edge and lower-edge blending, given the V-coordinate of the current pixel
      Multiply blending factors for the current V-coordinate together.
      Sum the U and V coordinate blending factors
    Sample the high-frequency noise map with the texture coordinate calculated for the current pixel
    Sample the low-frequency noise with the low-frequency texture coordinate calculated for the current pixel TABLE II-continued Exemplary Pixel Shader Program Operations Calculate and assign a transparency (alpha) value for the pixel value by multiplying high-frequency noise sample with the low-frequency noise sample low-frequency noise and edge blending factor
    Assign a color value passed as parameter to the pixel shader to the current pixel FIG. 5 shows an illustration of a dialog box 500 used to configure properties of a pencil stroke used to render vector drawing elements, according to one embodiment of the invention. As shown, dialog box 500 includes a stroke preview panel 505, a general stroke properties pane 510 and a pencil specific properties pane 515. Stroke preview pane 505 provides a user with a pencil stroke based on the current set of general stroke properties and pencil specific properties. Illustratively, the general stroke properties 510 include a stroke color 511, a stroke opacity value 512, and a media type 513. In this example, users may select to use the pencil-rendering effect of the present invention by setting the media type 513 to "pencil."

Pencil specific properties include a pencil hardness setting 516, a pencil darkness setting 517, a fade setting 518, a pencil-tip tilt setting 519, and a paper type setting 520. Hardness setting 516 may be used to specify a relative hardness of a pencil to use in simulating a pencil stroke. The darkness setting 517 may be used to set the saturation, or brightness of the stroke. The start/end fade setting 518 sets the length, typically in points, of the fade-in and fade-out at either end of a stroke. Tilt setting 519 simulates the angle at which the pencil is applied to the paper in creating the stroke. Paper type setting 520 may be used to specify a type of paper to use in simulating a pencil stroke. For example, paper type settings may include standard, art, pastel, course, and fine paper types. Vector graphics application 116 may be configured to set the appropriate scale, contrast, bias, V-factor, parameters for a given paper type. Similarly, shader programs 108 may use the pencil specific properties to simulate pencil strokes having the properties desired by a user.

Figure 6:
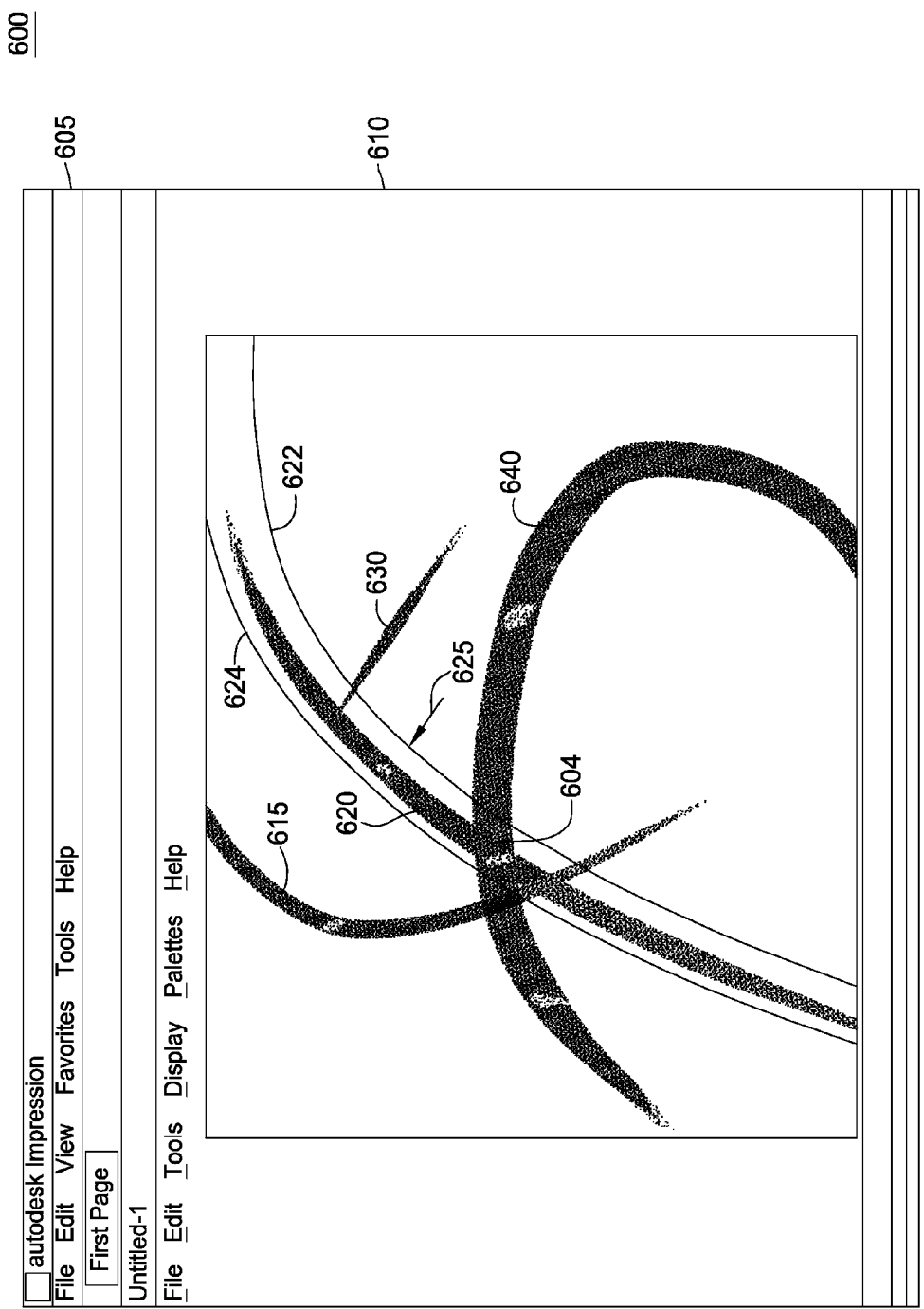
FIG. 6 illustrates a screen display of multiple vector drawing elements rendered using a pencil stroke effect, according to one embodiment of the invention.

FIG. 6 provides an illustration of a screen display 600 of multiple vector drawing elements rendered using a pencil stroke effect, according to one embodiment of the invention. As shown, screen display 600 includes graphical user interface panel 605 and display area 610. The interface panel 605 allows a user to interact with the vector graphics application to compose, edit, save, modify, etc. a vector-based drawing. Display area 610 shows a number of vector drawing elements rendered using a pencil stroke effect. Illustratively, display area 605 includes curved strokes 615, 620, and 640 and linear stroke 630. At the intersection of curved stroke 620 and 640, the simulation of a paper surface shows a region where neither stroke covers the paper, showing a lighter region. Because the structure of the paper surface is generated separately from the pencil stroke, this region should remain, regardless of the number of pencil strokes rendered over this point of the simulated paper surface. Further, because the rendered pixels for each vector drawing element have a transparency value, multiple strokes rendered at the same location may be visible. Thus, one drawing element does not overwrite one another; and instead a blended effect that mimics natural media strokes is achieved. Line 630 illustrates the effect of fade-in and fade-out settings on the appearance of a stroke effect; namely, the stroke begins at a single point and widens to a full stroke width before tapering off to a single end point. In this example, a user has selected curve 620 using a mouse cursor 625, resulting in stroke geometry lines 622 and 624 being shown. Stroke geometry lines 622 and 624 show the boundary of the vector drawing element rendered using the pencil stroke effect. The results of the smooth step function used to blend the sides of curve 620 with the underlying paper surface can be seen as the stroke fades out toward the edges of geometry lines 622 and 624. Additionally, the darker shaded region of curve 620 is off-center. This effect results from the use of the pencil-tip tilt setting to favor one side of the stroke geometry over the other during the rendering process.

Advantageously, embodiments of the invention may be used to generate display images of vector drawing elements that have a traditional media appearance. That is, an appearance that mimics the appearance of hand drawn pencil strokes. The appearance of a given stroke may be customized using a variety of parameters. For example, by using high and low frequency Perlin noise in addition to adjusting the scale, contrast and bias of the individual noise patterns a variety of realistic looking pencil effects can be created.

While the foregoing is directed to embodiments of the present invention, other embodiments of the invention may be devised without departing from the basic scope thereof, and the scope thereof is determined by the claims that follow.

We claim:

1. A method for generating a display of a vector drawing element using a vector-based drawing application to have an appearance of being hand-drawn using a media material, comprising:
   receiving the vector drawing element representative of hand-drawn line or curve;
   receiving a collection of stroke parameters, wherein each stroke parameter models an aspect of the media material for generating stroke geometry for the vector drawing element;
   simulating, by a processor, a paper surface using a high-frequency noise map and a low-frequency noise map;
   determining, by a processor, a set of pixels covered by the vector drawing element based on the stroke geometry for the vector drawing element;
   generating, by a processor, a smooth step map used to blend the set of pixels with the simulated paper surface;
   for each pixel in the set of pixels, sampling, with the processor, the high-frequency noise map, the low-frequency noise map, and the smooth step map, to determine a color and a transparency value for the pixel, wherein the transparency value is based on multiplying a value sampled from the high-frequency noise map with a value sampled from the low-frequency noise map and a value sampled from the smooth step map.

2. The method of claim 1, further comprising,
   generating the high-frequency noise map, wherein the high-frequency noise map is used to simulate fine structure elements of the paper surface;
   generating the low-frequency noise map, wherein the low-frequency noise map is used to simulate individual long fiber elements of the paper surface.

3. The method of claim 2, wherein the high-frequency noise map and the low-frequency noise map are stored as texture maps.

4. The method of claim 1, wherein the appearance of the media material simulates the appearance of a pencil stroke drawn on a paper surface.

5. The method of claim 1, wherein the high-frequency noise map and the low-frequency noise map are rendered using a Perlin noise function.

6. The method of claim 4, wherein the high-frequency noise map is generated using a bias, a scale, and a contrast parameter, wherein the scale parameter specifies the frequency the high-frequency noise map, the bias parameter specifies a center of a range of values for the high-frequency height map, and the contrast parameter specifies a maximum and minimum value for the high-frequency noise map.

7. The method of claim 1, wherein the vector drawing element is represented as a collection of input vertices, and wherein a processing unit of a graphics rendering pipeline is configured to process an input vertex by:
   transforming the input vertex coordinate into a page space coordinate;
   generating a high-frequency texture coordinate for the input vertex by multiplying the page space coordinate by a scale factor;
   generating a low-frequency texture coordinate for the input vertex by rotating the page space coordinate, applying a skew transformation to squeeze the resulting low-frequency texture coordinate and multiplying the page space coordinate by the scale factor; and
   generating a stroke length texture coordinate position for input vertex.

8. The method of claim 7, wherein a processing unit of a graphics rendering pipeline is configured to process a stream of input pixels, by:
   calculating an edge blending factor for an input pixel;
   sampling the high-frequency noise map with the high-frequency texture coordinate calculated for the input pixel;
   sampling the low-frequency noise map with the low-frequency texture coordinate calculated for the input pixel; and
   determining the transparency value for the input pixel value by multiplying the high-frequency noise sample with the low-frequency noise sample and the edge blending factor.

9. The method of claim 1, wherein the vector drawing element describes at least one of a point, a line, a polygon, an arc, a rectangle, a circle, a spline, an ellipse, an elliptical arc, an arc wedge, an elliptical arc wedge, and an symbol.

10. A computer-readable storage medium containing a program which when executed by a processor, performs operations for generating a display of a vector drawing element using a vector-based drawing application to have an appearance of being drawn using a media material, comprising:
    receiving the vector drawing element;
    receiving a collection of stroke parameters, wherein each stroke parameter models an aspect of the media material;
    simulating a paper surface using a high-frequency noise map and a low-frequency noise map;
    determining a set of pixels covered by the vector drawing element;
    generating a smooth step map used to blend the set of pixels with the simulated paper surface;
    for each pixel in the set of pixels, sampling the high-frequency noise map, the low-frequency noise map, and the smooth step map, to determine a color and a transparency value for the pixel;
    rendering a display having the pixels with the determined color and transparency value, wherein the transparency value is based on multiplying a value sampled from the high-frequency noise map with a value sampled from the low-frequency noise map and a value sampled from the smooth step map.

11. The computer-readable storage medium of claim 10, further comprising, generating the high-frequency noise map, wherein the high-frequency noise map is used to simulate fine structure elements of the paper surface;

generating the low-frequency noise map, wherein the low-frequency noise map is used to simulate individual long fiber elements of the paper surface.

12. The computer-readable storage medium of claim 11, wherein the high-frequency noise map and the low-frequency noise map are stored as texture maps.

13. The computer-readable storage medium of claim 10, wherein the appearance of the media material simulates the appearance of a pencil stroke drawn on a paper surface.

14. The computer-readable storage medium of claim 10, wherein the high-frequency noise map and the low-frequency noise map are rendered using a Perlin noise function.

15. The computer-readable storage medium of claim 14, wherein the high-frequency noise map is generated using a bias, a scale, and a contrast parameter, wherein the scale parameter specifies the frequency the high-frequency noise map, the bias parameter specifies a center of a range of values for the high-frequency height map, and the contrast parameter specifies a maximum and minimum value for the high-frequency noise map.

16. The computer-readable storage medium of claim 10, wherein the vector drawing element is represented as a collection of input vertices, and wherein the program includes a shader program executed by a processing unit of a graphics rendering pipeline configured to process an input vertex by:

transforming the input vertex coordinate into a page space coordinate;

generating a high-frequency texture coordinate for the input vertex by multiplying the page space coordinate by a scale factor;

generating a low-frequency texture coordinate for the input vertex by rotating the page space coordinate, applying a skew transformation to squeeze the resulting low-frequency texture coordinate and multiplying the page space coordinate by the scale factor; and generating a stroke length texture coordinate position for input vertex.

17. The computer-readable storage medium of claim 16, wherein the program includes a shader program executed by a processing unit of a graphics rendering pipeline configured to process a stream of input pixels by:

calculating an edge blending factor for an input pixel;

sampling the high-frequency noise map with the high-frequency texture coordinate calculated for the input pixel;

sampling the low-frequency noise map with the low-frequency texture coordinate calculated for the input pixel; and determining the transparency value for the input pixel value by multiplying the high-frequency noise sample with the low-frequency noise sample and the edge blending factor.

18. The computer-readable storage medium of claim 10, wherein the vector drawing element describes at least one of a point, a line, a polygon, an arc, a rectangle, a circle, a spline, an ellipse, an elliptical arc, an arc wedge, an ellip-tical arc wedge, and an symbol.

19. A computing device configured to generate a display representation of a vector drawing element, the computing device comprising:

a central processing unit coupled to a system memory; and a graphics processing unit coupled to the central processing unit and including a graphics rendering pipeline configured to:

receive a collection of stroke parameters, wherein each stroke parameter models an aspect of the media material, simulate a paper surface using a high-frequency noise map and a low-frequency noise map;

determine a set of pixels covered by the vector drawing element, generate a smooth step map used to blend the set of pixels with the simulated paper surface;

for each pixel in the set of pixels, sampling the high-frequency noise map, the low-frequency noise map, and the smooth step map, to determine a color value and a transparency value for the pixel; and rendering a display having the pixels with the determined color and transparency value, wherein the transparency value is based on multiplying a value sampled from the high-frequency noise map with a value sampled from the low-frequency noise map and a value sampled from the smooth step map.

20. The computing device of claim 19, wherein the graphics rendering pipeline is further configured to process a collection of input vertices by:

transforming an input vertex coordinate into a page space coordinate;

generating a high-frequency texture coordinate for the input vertex by multiplying the page space coordinate by a scale factor;

generating a low-frequency texture coordinate for the input vertex by rotating the page space coordinate, applying a skew transformation to squeeze the resulting low-frequency texture coordinate and multiplying the page space coordinate by the scale factor; and generating a stroke length texture coordinate position for input vertex.

21. The computing device of claim 20, wherein the graphics rendering pipeline is further configured to process a collection of input pixels by:

calculating an edge blending factor for an input pixel;

sampling the high-frequency noise map with the high-frequency texture coordinate calculated for the input pixel;

sampling the low-frequency noise map with the low-frequency texture coordinate calculated for the input pixel; and determining the transparency value for the input pixel value by multiplying the high-frequency noise sample with the low-frequency noise sample and the edge blending factor.

* * * * *